Oct. 31, 1967        E. HERION ET AL        3,349,800
       MULTI-WAY CHANGEOVER VALVE IN THE FORM OF A
              FLAT SLIDE VALVE WITH SERVO DRIVE
Filed Jan. 13, 1965                       2 Sheets-Sheet 1
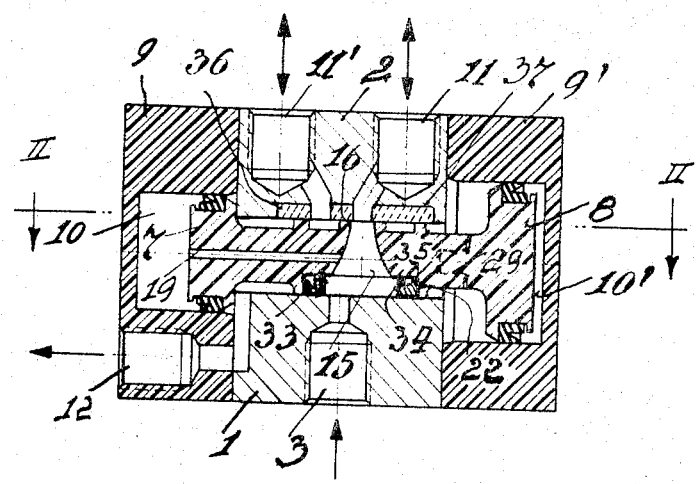
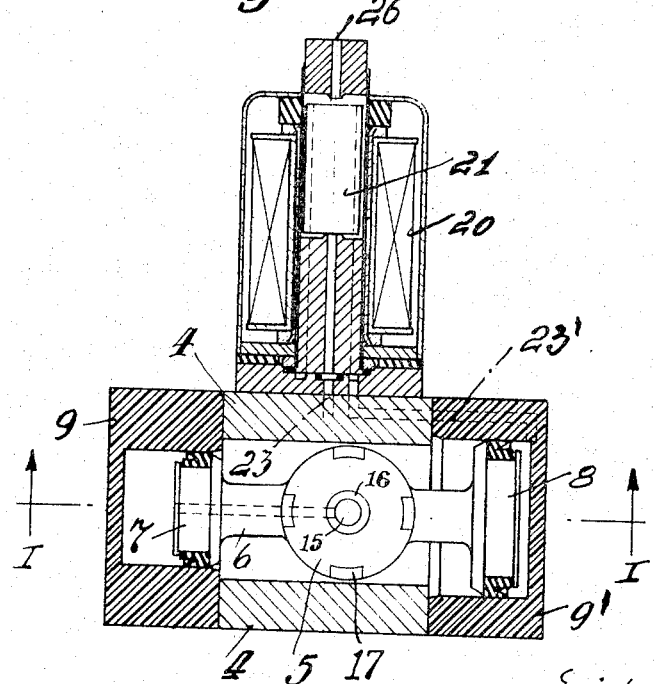
INVENTORS
Erich Herion
Erich Ruchser
By
Richard Low
Agt INVENTORS
Erich Herion
Erich Ruchser

United States Patent Office 3,349,800
Patented Oct. 31, 1967

3,349,800
MULTI-WAY CHANGEOVER VALVE IN THE FORM OF A FLAT SLIDE VALVE WITH SERVO DRIVE
Erich Herion, Distlerstrasse 22, Stuttgart-Frauenkopf, Germany, and Erich Ruchser, Rommelshausen, Germany; said Ruchser assignor to said Herion
Filed Jan. 13, 1965, Ser. No. 425,288
Claims priority, application Germany, Jan. 15, 1964, H 51,384
9 Claims. (Cl. 137—625.66)

This application relates to an improvement in slide valves of the type in which one inlet opening in one internal wall of a valve housing may be connected alternatively with two outlet openings in an opposite wall by a bore in a slide movable along the walls in a passage formed in the housing.

The object of the invention is the provision of a valve of the described type in which the useful life of the pressure seals is increased even in the absence of lubrication, and generally to improve the construction of the valve slide.

More specifically, the invention provides a valve having only one resilient seal between the valve slide and the valve housing on the inlet side, whereas the seal on the outlet side is formed by direct contact of the slide, which is preferably made of substantially rigid plastic, such as polyamide, with a hard facing on the valve housing, such as sintered aluminum oxide which may contain minor admixtures of silica or chromium oxide for increasing its hardness.

The transverse bore in the valve slide is provided with a larger orifice on the inlet side than on the outlet side so that the pressure of the controlled fluid tends to press the slide against the housing wall on the outlet side of the valve slide.

Other features, additional objects, and many of the attendant advantages of this invention will be readily appreciated as the same becomes better understood by reference to the following detailed description of preferred embodiments of the invention when considered with the appended drawings in which:

FIG. 1 shows a slide valve of the invention in section on the line I—I in FIG. 2;

FIG. 2 illustrates the valve of FIG. 1 in section on the line II—II;

Figure 3:
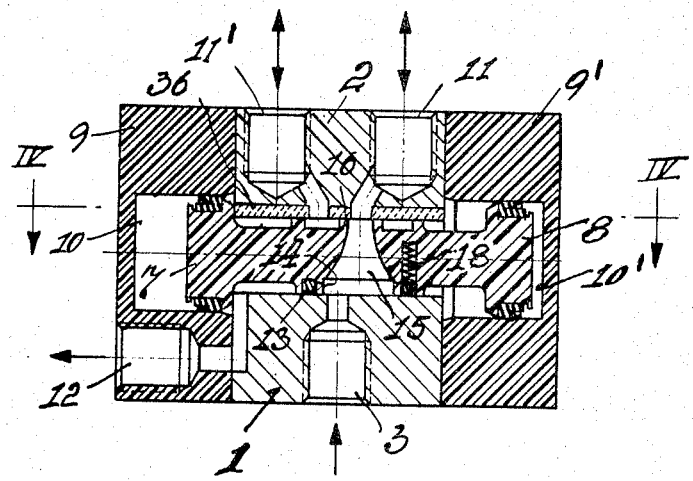
FIG. 3 is a sectional view of another valve of the invention taken on the line III—III in FIG. IV.

Referring now to the drawing in detail, and initially to FIGS. 1 and 2, there is seen a valve whose housing mainly consists of a bottom wall 1, a top wall 2, and two side walls 4 which enclose a passage of rectangular cross section. The bottom and side walls are integral, and the wall 2 provides a top cover for the passage. Its front and rear ends are closed by cup-shaped plastic caps 9, 9' respectively whose cavities are substantially cylindrical and open to the passage in the valve housing.

The top wall 2 in the housing passage has a shallow recess 37 receiving a facing plate 36 of hard, sintered aluminum oxide containing minor amounts (up to 6%) of silica and chromium oxide for increased hardness. The top wall 2 and the facing plate 36 are provided with two outlet openings 11, 11' for connection to a piece of hydraulic machinery controlled by the valve. The interior face of the bottom wall 1 opposite the facing plate 36 is provided with an inlet opening 3 for connection to a source of hydraulic pressure fluid.

A slide assembly reciprocable in the valve housing in a forward and backward direction includes the valve slide 5 proper which is essentially a flat circular disc. Two arms 6 extend from the disc 5 in opposite radial directions and carry respective pistons 7, 8 whose approximately circular faces directed away from each other axially bound chambers 10, 10' in the cavities of the caps 9, 9'. The effective face area of the piston 7 is much smaller than that of the piston 8.

An axial bore 15 in the disc 5 flares continuously in a direction from the top wall 2 toward the bottom wall 1 of the valve housing. Its narrow circular orifice contiguously adjacent the facing plate 36 is formed by a circular shoulder 16 on the disc 5. Its other orifice is wider than the external dimensions of the shoulder 16, and is defined by a circular sealing ring 34 which is partly received in an annular recess 33 of the disc 5. The sealing ring 34 is dimensioned for communication of the bore 15 with the inlet opening 3 in all operational conditions of the slide 5. Pressure fluid admitted from the inlet opening 3 presses a lip 35 of the ring 34 against the peripheral wall 22 of the recess 33 and the wall 1. Except for the sealing ring 34 and similar rings on the pistons 7, 8, the entire slide assembly is molded from polyamide plastic, and has but one joint at 29 as will presently be described.

A radial bore 19 extends from the bore 15 through the slide 5, one of the arms 6, and the smaller piston 7 into the chamber 10. One of the side walls 4 carries a pilot valve 21 operated by a solenoid 20 which shifts its armature away from the position shown in FIG. 2 when energized. The armature is normally held in the illustrated position in a conventional manner, not shown in detail, to seal a conduit 23 connected with the inlet opening 3, and to permit venting of the chamber 10' through a conduit 23' and a discharge passage 26 of the pilot valve.

The slide assembly is held vertically in the illustrated position by the resilience of the ring 34 which urges the slide 5 toward the facing plate 36, and by the fluid admitted through the inlet opening 3 and discharged through the outlet opening 11 which exerts upward pressure on the slide 5 because of the configuration of the bore 15. The spatial relationship of the slide 5 and the facing plate 36 is precisely maintained by four integral projecting spacers 17 equiangularly arranged on the periphery of the disc 5 and abuttingly engaging the facing plate 36.

The outlet opening 11', also normally connected to the piece of hydraulic machinery controlled by the illustrated valve, communicates with a free return space between the housing walls and the slide assembly through the interstices between the spacers 17 and a return opening 12 in the cap 9 which is normally connected to a sump in a conventional manner. Any fluid leaking between the slide assembly and the housing walls from the orifices of the bore 15 is discharged through the return opening 12.

The illustrated horizontal position of the slide assembly is maintained by the full inlet pressure of the hydraulic fluid applied to the face of the piston 7 in the chamber 10 while the chamber 10' is vented through the pilot valve 21. When the solenoid 20 is energized, the armature of the valve blocks the discharge passage 26 and connects the chamber 10' to the inlet opening 3 through the conduits 23, 23'. The fluid pressure applied to the larger effective piston face of the piston 8 in the chamber 10' then shifts the slide assembly to the non-illustrated other terminal position in which the outlet opening 11' is connected to the inlet opening 3 by the bore 15, and the outlet opening 11 is connected to the return opening 12 by the return space about the shoulder 16 and the sealing ring 34.

The contact pressure between the shoulder 16 and the spacers 17 of plastic material and the ceramic facing plate 36 is mainly determined by the pressure of the controlled fluid. This pressure also determines the force available for shifting the slide assembly between its terminal positions in which the pistons 7, 8 respectively abut against one or more walls of the housing. A desirable relationship between the contact pressure and the operating force for the pistons 7, 8 is maintained if the larger orifice of the conduit extending from the shoulder 16 through the bore 15 and the opening in the sealing ring 34 is smaller than the effective piston face of the piston 7.

Figure 4:
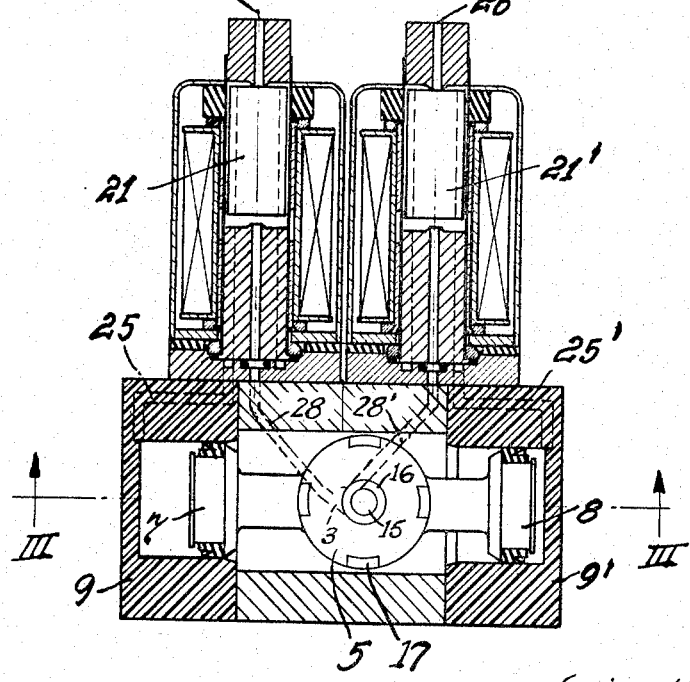
FIG. 4 shows the valve of FIG. 3 in section on the line IV—IV.

The slide valve shown in FIGS. 3 and 4 is closely similar to that discussed above with reference to FIGS. 1 and 2. Identical or corresponding elements have been designated with the same numerals, and the following description will be limited to the differences between the two valves.

The pistons 7, 8 shown in FIGS. 3 and 4 and the corresponding cylinder chambers 10, 10' in the caps 9, 9' are equal in cross section, their pressure fluid supply is controlled by individual pilot valves 21, 21' which normally connect the chambers 10, 10 to the inlet opening 3 through conduits 28, 25 and 28', 25', and vent the chambers through discharge passage 26, 26' when the pilot valves are energized.

The annular sealing element of the valve is an O-ring 13 partly received in a downwardly open annular groove of the slide 5 and biased outward of the groove by helical springs 18 of which only one is seen in FIG. 3. Slots 14 in the slide 5 radially connect the annular groove with the lower orifice of the bore 15 in such a manner that the pressure fluid tends to drive the O-ring 13 radially outward against the groove wall and downward against the face of the bottom wall 1.

The exposed surface of the facing plate 36 is ground and lapped. Its friction against the plastic surfaces of the shoulder 16 and of the spacers 17 is very low even in the absence of a lubricant. Wear of the engaged surfaces is therefore very small. The sealing rings 13, 34 can readily be replaced without opening the pressure connections between the valve housing and the piping which normally engages the inlet opening 3 and the outlet openings 11, 11'. As shown in FIG. 1, the piston 8 is releasably connected to the associated arm 6 by a plug-in joint 29. When the caps 9, 9 are removed, the piston 8 can be withdrawn toward the right, as viewed in FIGS. 1 and 2, and the remainder of the slide assembly may then be pulled from the housing toward the left. Re-assembly after replacement of the ring 34 is similarly simple.

While the invention has been described with particular reference to specific embodiments, it will be understood that it is not limited thereto, but is to be construed broadly and limited solely by the scope and spirit of the appended claims.

We claim:
1. A slide valve comprising, in combination:
 (a) a valve housing defining a passage extending in a predetermined direction and having two spacedly opposite faces in said passage,
  (1) said housing being formed with an inlet opening in one of said faces and with two outlet openings in the other face, said outlet openings being spaced in said direction;
 (b) slide means received in said passage for movement in said direction,
  (1) said slide means being formed with a bore therethrough transverse of said direction;
 (c) annular resilient sealing means interposed between said slide means and said one face for resiliently urging said slide means toward said other face,
  (1) said sealing means and said bore being elements of a conduit having respective first and second terminal orifices contiguously adjacent said faces and continuously flaring from said second to said first orifice, the first orifice being adjacent said one face and having a substantially greater cross section than the second orifice adjacent said other face; and
 (d) actuating means for reciprocating said slide means in said direction between two terminal positions, said first orifice communicating with said inlet opening in said two terminal positions, and said second orifice communicating with only one of said outlet openings respectively in said two positions.

2. A valve as set forth in claim 1, wherein said slide means include a slide member spaced from said faces, said sealing means include a sealing member secured to said slide member for movement therewith and interposed between said slide member and said one face, the valve further comprising an annular shoulder on said slide member in sliding abutting engagement with said other face, said shoulder constituting said second orifice, said slide member and said faces defining a return space therebetween about said shoulder and said sealing member in said passage, said housing being formed with a return opening communicating with said return space.

3. A valve as set forth in claim 2, wherein said annular sealing member is partly received in said slide member, the slide member being formed with a duct communicating with said conduit for leading pressure fluid from said conduit against said sealing member in a direction for urging the sealing member into contact with said one face.

4. A valve as set forth in claim 2, further comprising a plurality of spacer members on said slide member in said return space, said spacer members being spaced from each other and from said shoulder and engaging said other face for guiding movement of said slide member.

5. A valve as set forth in claim 2, further comprising two cylinder members closing said passage in said direction, said actuating means including two piston members fixedly fastened to said slide member for movement therewith, said piston members being sealingly received in said cylinder members for movement in said direction, and defining respective chambers in said cylinder members offset from the respective piston members in a direction away from said slide member, and fluid control means for admitting pressure fluid to said chambers and for releasing said fluid from said chambers.

6. A valve as set forth in claim 5, wherein said slide members, said shoulder, and at least one of said piston members constitute a unitary body of plastic.

7. A valve as set forth in claim 5, wherein said piston members have respective piston faces in the associated chambers, the cross section of said first orifice being smaller than the effective piston face of each of said piston members.

8. A slide valve comprising, in combination:
 (a) a valve housing defining a passage extending in a predetermined direction and having two spacedly opposite faces in said passage,
  (1) said housing being formed with an inlet opening in one of said faces and with two outlet openings in the other face, said outlet openings being spaced in said direction;
 (b) slide means received in said passage for movement in said direction,
  (1) said slide means including a slide member spaced from said faces and formed with a bore therethrough transverse of said direction;
 (c) an annular, resilient sealing member interposed between said slide member and said one face for resiliently urging said slide means toward said other face,
  (1) said sealing member being secured to said slide member for movement therewith;
 (d) an annular shoulder on said slide member in sliding abutting engagement with said other face,
  (1) said sealing member, said bore, and said shoulder being aligned jointly to constitute a conduit having respective first and second terminal orifices contiguously adjacent said faces, the first orifice being defined by said sealing member and having a substantially greater cross section than the second orifice defined by said shoulder,
(2) said slide member and said faces defining a return space therebetween about said shoulder and said sealing member in said passage, said housing being formed with a return opening communicating with said return space; and
(e) actuating means for reciprocating said slide member in said direction between two terminal positions, said first orifice communicating with said inlet opening in said two terminal positions, and said second orifice communicating with only one of said outlet openings respectively in said two positions,
(1) said actuating means including two cylinder members closing the ends of said passage in said direction and two piston members fixedly fastened to said slide member for movement therewith, said piston members being sealingly received in said cylinder members respectively for movement in said direction and defining respective chambers in said cylinder members, and fluid control means for admitting pressure fluid to said chambers and for releasing said fluid from said chambers,
(2) said slide member, said shoulder, and at least one of said piston members constituting a unitary body of plastic, and said other face consisting of a ceramic material much harder than said plastic.

9. A slide valve comprising, in combination:
(a) a valve housing defining a passage extending in a predetermined direction and having two spacedly opposite faces in said passage,
(1) said housing being formed with an inlet opening in one of said faces and with two outlet openings in the other face, said outlet openings being spaced in said direction;
(b) slide means received in said passage for movement in said direction,
(1) said slide means including a slide member spaced from said faces and formed with a bore therethrough transverse of said direction;
(c) an annular, resilient sealing member interposed between said slide member and said one face for resiliently urging said slide means toward said other face,
(1) said sealing member being secured to said slide member for movement therewith;
(d) an annular shoulder on said slide member in sliding abutting engagement with said other face,
(1) said sealing member, said bore, and said shoulder being aligned jointly to constitute a conduit having respective first and second terminal orifices contiguously adjacent said faces, the first orifice being defined by said sealing member and having a substantially greater cross section than the second orifice defined by said shoulder,
(2) said slide member and said faces defining a return space therebetween about said shoulder and said sealing member in said passage, said housing being formed with a return opening communicating with said return space; and
(e) actuating means for reciprocating said slide member in said direction between two terminal positions, said first orifice communicating with said inlet opening in said two terminal positions, and said second orifice communicating with only one of said outlet openings respectively in said two positions,
(1) said actuating means including two cylinder members closing the ends of said passage in said direction and two piston members fixedly fastened to said slide member for movement therewith, said piston members being sealingly received in said cylinder members respectively for movement in said direction and defining respective chambers in said cylinder members, and fluid control means for admitting pressure fluid to said chambers and for releasing said fluid from said chambers,
(2) said chambers being offset from the respective piston members in a direction away from said slide member,
(3) one of said piston members having a smaller effective piston face in the associated chamber than the other piston member,
(4) said fluid control means including a conduit permanently connecting the chamber associated with said one piston member to said inlet opening, and valve means interposed between said inlet opening and the chamber associated with the other piston member.

References Cited

UNITED STATES PATENTS

| | | | |
|---|---|---|---|
| 463,260 | 11/1891 | Frew | 251—176 X |
| 656,888 | 8/1900 | Haines | 251—176 |
| 2,517,061 | 8/1950 | Von Stackelberg | 251—368 |
| 2,725,077 | 11/1955 | Nicholl | 137—625.64 |
| 2,745,429 | 5/1956 | Crookston | 251—31 X |
| 2,772,695 | 12/1956 | Harrison | 251—176 X |
| 2,912,007 | 11/1959 | Johnson | 137—625.64 X |
| 2,916,051 | 12/1959 | Taylor | 251—176 X |
| 3,020,927 | 2/1962 | McLaughlin | 137—625.68 |

M. CARY NELSON, *Primary Examiner.*

R. J. MILLER, *Assistant Examiner.*